(12) United States Patent
Kamohara et al.

(10) Patent No.: US 7,456,246 B2
(45) Date of Patent: Nov. 25, 2008

(54) HYDROPHILIC POLYORGANOSILOXANE COMPOSITION

(75) Inventors: Hiroshi Kamohara, Itabashi-ku (JP); Toshiyuki Ozai, Usui-gun (JP)

(73) Assignees: GC Corporation, Tokyo (JP); Shin-Etsu Chemical Co., Ltd., Tokyo (JP)

( * ) Notice: Subject to any disclaimer, the term of this patent is extended or adjusted under 35 U.S.C. 154(b) by 0 days.

(21) Appl. No.: 10/724,221

(22) Filed: Dec. 1, 2003

(65) Prior Publication Data

US 2004/0152858 A1 Aug. 5, 2004

(30) Foreign Application Priority Data

Dec. 2, 2002 (JP) ............................. 2002-350117

(51) Int. Cl.
*C08G 77/12* (2006.01)
*C08G 77/14* (2006.01)
*C08G 77/20* (2006.01)

(52) U.S. Cl. ........................... 528/43; 528/31; 525/474; 523/109

(58) Field of Classification Search ................... 528/43, 528/31; 525/474; 523/109
See application file for complete search history.

(56) References Cited

U.S. PATENT DOCUMENTS 3,070,566 A * 12/1962 Nitzsche et al. ............... 524/80
4,657,959 A * 4/1987 Bryan et al. ................. 524/266
4,877,854 A 10/1989 Hattori et al.
5,415,544 A * 5/1995 Oxman et al. ................. 433/48
5,580,921 A 12/1996 Stepp et al.
5,786,414 A * 7/1998 Chikuni et al. ............... 523/413
5,849,812 A 12/1998 Zech et al.
5,907,002 A 5/1999 Kamohara et al.
6,762,242 B1 * 7/2004 Torto et al. ................... 524/588

FOREIGN PATENT DOCUMENTS

| EP | 0 934 959 A1 | 8/1999 |
|---|---|---|
| JP | 55-060557 A | 5/1980 |
| JP | 59-025837 A | 2/1984 |
| JP | 02-132151 A | 5/1990 |
| JP | 03-068658 A | 3/1991 |
| JP | 04-272960 A | 9/1992 |
| JP | 04-353564 A | 12/1992 |
| JP | 10-072307 A | 3/1998 |
| JP | 11-349814 A | 12/1999 |
| JP | 2001-106915 A | 4/2001 |
| JP | 2003-040723 A | 2/2003 |
| WO | 00/61074 | * 10/2000 |
| WO | WO-02/094938 A2 | 11/2002 |

* cited by examiner

*Primary Examiner*—Kuo-Liang Peng
(74) *Attorney, Agent, or Firm*—Birch, Stewart, Kolasch & Birch, LLP

(57) ABSTRACT

A hydrophilic polyorganosiloxane composition comprising (A) a curable organopolysiloxane containing at least 5 mol % of diphenylsiloxane units or at least 10 mol % of methylphenylsiloxane units, (B) a curing agent, and (C) a specific polyether cures into an elastomeric or gel-like silicone product having excellent hydrophilic properties and prevents separation of the polyether over time.

27 Claims, No Drawings

HYDROPHILIC POLYORGANOSILOXANE COMPOSITION

This Nonprovisional application claims priority under 35 U.S.C. § 119(a) on Patent Application No(s). 2002-350117 filed in JAPAN on Dec. 2, 2002, the entire contents of which are hereby incorporated by reference.

BACKGROUND OF THE INVENTION

1. Technical Field

This invention relates to a hydrophilic polyorganosiloxane composition which cures into an elastomeric or gel-like product, that is, cured silicone rubber or cured silicone gel.

2. Background Art

Polyorganosiloxane compositions currently find widespread use in building, electric/electronic and dental applications. Due to the siloxane's own property of water repellence, these compositions suffer from problems. In the building application, it is difficult to apply aqueous paint to the surface of material. In the dental application, the composition is useful as dental impression material, but difficult to take a precise impression.

The above problems are conventionally remedied in the building application by adding a hydrophilic filler such as calcium carbonate and in the dental application by adding polyether. Such solutions are unsatisfactory in either application partially because the base is polydimethylsiloxane. The mere addition of filler allows for variant coatings of aqueous paint. On the internal addition of polyether, the polyether will separate from the composition in the uncured or cured state with the passage of time, resulting in variations of impression.

JP-B 6-37558 corresponding to U.S. Pat. No. 4,877,854 discloses a curable composition comprising an allyl-terminated polyether as a base polymer and a polyether-modified organohydrogenpolysiloxane as a crosslinking agent. This crosslinking agent is difficult to synthesize. Still worse, the curing property declines with time as the allyl groups at base polymer ends undergo internal rearrangement by the oxidizing action of platinum catalyst.

SUMMARY OF THE INVENTION

An object of the present invention is to provide a hydrophilic polyorganosiloxane composition which has a good cure ability and an improved stability sufficient to prevent separation of polyether over time and cures into a product having satisfactory hydrophilic property.

We have found that a satisfactory hydrophilic polyorganosiloxane composition is obtained by using a curable organopolysiloxane containing at least 5 mol % of diphenylsiloxane units or at least 10 mol % of methylphenylsiloxane units as the base polymer and combining it with a polyether. The polyorganosiloxane composition is effectively curable and cures into a product that is highly hydrophilic as demonstrated by a contact angle of up to 70°, especially up to 65° as measured according to JIS R3257. Even after long-term storage, the polyorganosiloxane composition prevents the polyether from separating from the composition either in the uncured or cured state. The composition is effective for minimizing variations of a coating of aqueous paint applied thereon or variations in the impression to which it is made.

Accordingly, the present invention provides a hydrophilic polyorganosiloxane composition comprising as essential components, (A) a curable organopolysiloxane containing at least 5 mol % of diphenylsiloxane units or at least 10 mol % of methylphenylsiloxane units, (B) a curing agent for curing the organopolysiloxane (A), and (C) a polyether having the compositional formula (1):

$$R^1O(C_2H_4O)_m(C_3H_6O)_nR^1 \qquad (1)$$

wherein $R^1$ is hydrogen, $C_3H_6SiR^2_k(OR^2)_{3-k}$ (wherein $R^2$ is a monovalent hydrocarbon group and k is 0, 1, 2 or 3) or a monovalent hydrocarbon group, two $R^1$ groups may be the same or different, m is an integer of 0 to 100, n is an integer of 0 to 350, and the sum of m+n is an integer of 3 to 350.

DESCRIPTION OF PREFERRED EMBODIMENTS

The polyorganosiloxane composition of the invention may be formulated to any cure mechanisms including hydrosilylation reaction (addition reaction) curing type, organic peroxide curing type, and condensation reaction curing type.

Regardless of the cure mechanism, the organopolysiloxane (A) as the base polymer contains at least 5 mol %, typically 5 to 50 mol %, more preferably 5 to 40 mol %, even more preferably 10 to 30 mol % of diphenylsiloxane units in the diorganosiloxane units of which the backbone is constructed, or at least 10 mol %, typically 10 to 50 mol %, more preferably 20 to 40 mol %, even more preferably 25 to 35 mol % of methylphenylsiloxane units in the diorganosiloxane units of which the backbone is constructed. The objects of the invention are not attained if the content of diphenylsiloxane or methylphenylsiloxane units is less than the above-defined range.

In a first embodiment wherein the composition cures by means of hydrosilylation reaction, component (A) is preferably a polyorganosiloxane having on the average at least 0.1, more preferably at least 0.5, even more preferably at least 0.8, most preferably at least 2 silicon atom-bonded alkenyl groups per molecule.

The alkenyl group-containing organopolysiloxanes include those of the average compositional formula (i).

$$R^3_a SiO_{(4-a)/2} \qquad (i)$$

wherein $R^3$ is independently selected from substituted or unsubstituted monovalent hydrocarbon groups having 1 to 10 carbon atoms, preferably 1 to 8 carbon atoms, and "a" is a positive number in the range of 1.5 to 2.8, preferably 1.8 to 2.5, more preferably 1.95 to 2.05.

Examples of the silicon atom-bonded substituted or unsubstituted monovalent hydrocarbon groups represented by $R^3$ include alkyl groups such as methyl, ethyl, propyl, isopropyl, butyl, isobutyl, tert-butyl, pentyl, neopentyl, hexyl, cyclohexyl, octyl, nonyl and decyl, aryl groups such as phenyl, tolyl, xylyl and naphthyl, aralkyl groups such as benzyl, phenylethyl, and phenylpropyl, alkenyl groups such as vinyl, allyl, propenyl, isopropenyl, butenyl, hexenyl, cyclohexenyl and octenyl, and substituted ones of the foregoing groups in which some or all of the hydrogen atoms are substituted with halogen atoms (e.g., fluoro, bromo, chloro), cyano groups or the like, such as halo-substituted alkyl groups like chloromethyl, chloropropyl, bromoethyl and trifluoropropyl, and cyanoethyl.

It is requisite that among the groups $R^3$, on the average, at least 0.1, preferably at least 0.5, more preferably at least 0.8, most preferably at least 2 groups be alkenyl groups (which preferably have 2 to 8 carbon atoms, more preferably 2 to 6 carbon atoms). The content of alkenyl groups is preferably about 0.0001 to 20 mol %, more preferably about 0.001 to 10 mol %, even more preferably about 0.01 to 5 mol % based on the entire organic groups (i.e., substituted or unsubstituted monovalent hydrocarbon groups) $R^3$. The alkenyl groups may be bonded to either silicon atoms at ends of the molecular chain or silicon atoms midway the molecular chain or both. It is preferred for the organopolysiloxane to contain alkenyl groups bonded to silicon atoms at both ends of the molecular chain.

Also preferably, the polyorganosiloxane has a viscosity at 23° C. of 10 to 500,000 mPa.s, more preferably 400 to 200,000 mPa.s. With a viscosity of less than 10 mPa.s, the resulting silicone rubber tends to have noticeably degraded physical properties. With a viscosity at 23° C. of more than 500,000 mPa.s, the resulting silicone rubber tends to become difficult to handle or inefficient to work.

No particular limits are imposed on the molecular structure of the polyorganosiloxane. The molecular structures include straight chain, branched chain, partially branched straight chain, and dendritic (three-dimensional network) structures. Preferred is a straight-chain diorganopolysiloxane whose backbone consists essentially of repeating diorganosiloxane units and which is capped with triorganosiloxy groups at both ends of the molecular chain.

The polyorganosiloxane may be a homopolymer having such a molecular structure, a copolymer having such a molecular structure or a mixture of any of these polymers.

It is only required that the organopolysiloxane contain at least 5 mol % of diphenylsiloxane units or at least 10 mol % of methylphenylsiloxane units in the diorganosiloxane units of which the backbone is constructed, mol % being based on the entire base polymer. Then, for example, a mixture of 50 parts by weight of a both end dimethylvinylsiloxy group-capped polydimethylsiloxane containing 10 mol % diphenylsiloxane and 50 parts by weight of a both end dimethylvinylsiloxy group-capped polydimethylsiloxane is equally effective.

Examples of suitable polyorganosiloxane serving as the base polymer include
both end dimethylvinylsiloxy group-capped polydimethylsiloxane,
both end methyldivinylsiloxy group-capped polydimethylsiloxane,
both end dimethylvinylsiloxy group-capped dimethylsiloxane (80 mol %)/methylphenylsiloxane (20 mol %) copolymers,
both end dimethylvinylsiloxy group-capped dimethylsiloxane (80 mol %)/diphenylsiloxane (20 mol %) copolymers,
both end dimethylvinylsiloxy group-capped dimethylsiloxane (90 mol %)/diphenylsiloxane (10 mol %) copolymers, and both end trimethylsiloxy group-capped dimethylsiloxane/methylvinylsiloxane copolymers.

In the first embodiment wherein the composition is of the hydrosilylation (or addition) reaction curing type, component (B) is a curing agent comprising an organohydrogenpolysiloxane having on the average at least 2 silicon atom-bonded hydrogen atoms (i.e., SiH groups) per molecule and an addition reaction catalyst.

The organohydrogenpolysiloxane serves as a crosslinking agent for causing the composition to cure through hydrosilylating addition reaction with the alkenyl group-containing organopolysiloxane. It typically has the average compositional formula (ii):

$$R^4{}_bH_cSiO_{(4-b-c)/2} \qquad \text{(ii)}$$

wherein $R^4$ is a substituted or unsubstituted monovalent hydrocarbon group having 1 to 10 carbon atoms, b is a positive number of 0.7 to 2.1, c is a positive number of 0.001 to 1.0, and the sum of b+c is 0.8 to 3.0. The number of silicon atom-bonded hydrogen atoms (SiH groups) per molecule is at least 2, preferably at least 3, typically about 3 to about 200, more preferably about 3 to about 100.

Examples of $R^4$ are the same as exemplified for $R^3$ in formula (i), with those free of aliphatic unsaturation being preferred.

Typical examples of the organohydrogenpolysiloxane include 1,1,3,3-tetramethyldisiloxane, 1,3,5,7-tetramethylcyclotetrasiloxane, both end trimethylsiloxy-capped methylhydrogenpolysiloxane, both end trimethylsiloxy-capped dimethylsiloxane/methyl-hydrogensiloxane copolymers, both end dimethylhydrogensiloxy-capped dimethylpolysiloxane, both end dimethylhydrogensiloxy-capped dimethylsiloxane/methylhydrogensiloxane copolymers, both end trimethylsiloxy-capped methylhydrogensiloxane/diphenylsiloxane copolymers, both end trimethylsiloxy-capped methylhydrogen-siloxane/diphenylsiloxane/dimethylsiloxane copolymers, copolymers consisting of $(CH_3)_2HSiO_{1/2}$ units and $SiO_{4/2}$ units, and copolymers consisting of $(CH_3)_2HSiO_{1/2}$ units, $SiO_{4/2}$ units and $(C_6H_5)_1SiO_{1/2}$ units.

The molecular structure of the organohydrogenpolysiloxane may be a straight, branched, cyclic or three-dimensional network structure. The number of silicon atoms per molecule, i.e., degree of polymerization is preferably in the range of about 3 to about 1,000, more preferably about 3 to about 300. Also preferably the organohydrogenpolysiloxane has a viscosity at 23° C. of 10 to 100,000 mPa.s, more preferably 10 to 5,000 mPa.s.

In the inventive composition, the polyorganosiloxane having silicon atom-bonded hydrogen atoms is preferably incorporated in such amounts that 0.1 to 4.0 moles of silicon atom-bonded hydrogen atoms are available per mole of silicon atom-bonded alkenyl groups in component (A). If the amount of this component is below the above-defined range, the composition may become less curable. If the amount of this component is beyond the above-defined range, the cured product may become too hard and develop many cracks on the surface.

The addition reaction catalyst is to promote the hydrosilylating addition reaction between alkenyl groups in component (A) and SiH groups in component (B). Typical addition reaction catalysts are platinum group metal catalysts including platinum catalysts such as platinum black, platinum chloride, chloroplatinic acid, the reaction products of chloroplatinic acid with monohydric alcohols, complexes of chloroplatinic acid with olefins, and platinum bisacetoacetate, palladium catalysts, and rhodium catalysts. The addition reaction catalyst may be used in a catalytic amount, preferably in such an amount to give about 0.5 to 1000 ppm, especially about 1 to 500 ppm of platinum group metal based on the weight of components (A) and (B) combined.

In a second embodiment wherein the composition cures by means of free radical reaction, that is, of the organic peroxide curing type, component (A) is preferably a polyorganosiloxane having at least one, more preferably at least two silicon atom-bonded alkenyl groups per molecule. More preferably it has the average compositional formula (iii):

$$R^5{}_aSiO_{(4-d)/2} \qquad \text{(iii)}$$

wherein $R^5$ is a substituted or unsubstituted monovalent hydrocarbon group or hydroxyl group, 0.0001 to 10 mol % of $R^5$ being alkenyl groups and at least 80 mol % of $R^5$ being methyl groups, and d is a positive number in the range of 1.9 to 2.4.

In formula (iii), $R^5$ which may be the same or different is a substituted or unsubstituted monovalent hydrocarbon group, preferably having 1 to 10 carbon atoms, more preferably 1 to 8 carbon atoms or a hydroxyl group, and d is a positive number in the range of 1.9 to 2.4, preferably 1.95 to 2.05, more preferably 1.98 to 2.02.

Examples of the silicon atom-bonded substituted or unsubstituted monovalent hydrocarbon groups represented by $R^5$ are the same as exemplified for $R^3$ in formula (i) and include alkyl groups such as methyl, ethyl, propyl, isopropyl, butyl, isobutyl, tert-butyl, pentyl, neopentyl, hexyl, cyclohexyl, octyl, nonyl and decyl, aryl groups such as phenyl, tolyl, xylyl and naphthyl, aralkyl groups such as benzyl, phenylethyl, and phenylpropyl, alkenyl groups such as vinyl, allyl, propenyl, isopropenyl, butenyl, hexenyl, cyclohexenyl and octenyl, and substituted ones of the foregoing groups in which some or all of the hydrogen atoms are substituted with halogen atoms (e.g., fluoro, bromo, chloro), cyano groups or the like, such as halo-substituted alkyl groups like chloromethyl, chloropropyl, bromoethyl and trifluoropropyl, and cyanoethyl.

It is requisite that among the groups $R^5$, at least one, preferably at least two groups be alkenyl groups (which preferably have 2 to 8 carbon atoms, more preferably 2 to 6 carbon atoms). The content of alkenyl groups is preferably about 0.0001 to 10 mol %, more preferably about 0.001 to 5 mol % based on the entire organic groups (i.e., substituted or unsubstituted monovalent hydrocarbon groups) $R^5$. The alkenyl groups may be bonded to either silicon atoms at ends of the molecular chain or silicon atoms midway the molecular chain or both.

Also preferably, the polyorganosiloxane has a viscosity at 23° C. of 100,000 to 10,000,000 mPa.s, more preferably 200,000 to 8,000,000 mPa.s. With a viscosity below the lower limit, the resulting silicone rubber tends to have noticeably degraded physical properties. With a viscosity beyond the upper limit, the silicone rubber composition tends to become difficult to handle or inefficient to work.

No particular limits are imposed on the molecular structure of the polyorganosiloxane. The molecular structures include straight chain, branched chain, partially branched straight chain, and dendritic (three-dimensional network) structures. Preferred is a straight-chain diorganopolysiloxane whose backbone consists essentially of repeating diorganosiloxane units and which is capped with triorganosiloxy groups and/or hydroxyl groups at both ends of the molecular chain. The polyorganosiloxane may be a homopolymer having such a molecular structure, a copolymer having such a molecular structure or a mixture of any of these polymers. It is only required that the organopolysiloxane contain at least 5 mol % of diphenylsiloxane units or at least 10 mol % of methylphenylsiloxane units in the diorganosiloxane units of which the backbone is constructed, mol % being based on the entire base polymer. Then, for example, a mixture of 50 parts by weight of a both end dimethylvinylsiloxy group-capped polydimethylsiloxane containing 10 mol % diphenylsiloxane and 50 parts by weight of a both end dimethylvinylsiloxy group-capped polydimethylsiloxane is equally effective.

Examples of suitable polyorganosiloxane serving as the base polymer include both end dimethylvinylsiloxy group-capped polydimethylsiloxane, both end methylphenylvinylsiloxy group-capped polydimethylsiloxane, both end dimethylvinylsiloxy group-capped dimethylsiloxane (80 mol %)/methylphenylsiloxane (20 mol %) copolymers, both end dimethylvinylsiloxy group-capped dimethylsiloxane (80 mol %)/diphenylsiloxane (20 mol %) copolymers, both end dimethylvinylsiloxy group-capped dimethylsiloxane/methyl-vinylsiloxane copolymers, both end trimethylsiloxy group-capped dimethylsiloxane/methylvinylsiloxane copolymers, both end dimethylvinylsiloxy group-capped polymethyl(3,3,3-trifluoropropyl)siloxane, both end silanol group-capped dimethylsiloxane/methylvinylsiloxane copolymers, and both end silanol group-capped dimethylsiloxane (50 mol %)/methylvinyl-siloxane (30 mol %)/methylphenylsiloxane (20 mol %) copolymers.

In the second embodiment wherein the composition cures by means of free radical reaction, component (B) is an organic peroxide. Use may be made of any of well-known organic peroxides. Examples include, but are not limited to, benzoyl peroxide, 2,4-dichlorobenzoyl peroxide, p-methylbenzoyl peroxide, o-methylbenzoyl peroxide, 2,4-dicumyl peroxide, 2,5-dimethyl-bis(2,5-t-butylperoxy)-hexane, di-t-butylperoxide, t-butylperbenzoate, and 1,1-bis(t-butylperoxycarboxy)hexane.

The organic peroxide is added in a catalytic amount, which may be determined as appropriate in accordance with the desired cure rate. Usually the organic peroxide is added in an amount of 0.1 to 10 parts by weight, preferably 0.2 to 2 parts by weight per 100 parts by weight of component (A).

In a third embodiment wherein the composition cures by means of condensation reaction, component (A) is preferably a polyorganosiloxane having at least two silanol groups (i.e., silicon atom-bonded hydroxyl groups) or silicon atom-bonded hydrolyzable groups per molecule.

Examples of silicon atom-bonded hydrolyzable groups on the polyorganosiloxane include alkoxy groups such as methoxy, ethoxy and propoxy; alkoxyalkoxy groups such as methoxyethoxy, ethoxyethoxy and methoxypropoxy; acyloxy groups such as acetoxy and octanoyloxy; ketoxime groups such as dimethylketoxime, methylketoxime and methylethylketoxime; alkenyloxy groups such as vinyloxy, isopropenyloxy, and 1-ethyl-2-methylvinyloxy; amino groups such as dimethylamino, diethylamino and butylamino; aminoxy groups such as dimethylaminoxy and diethylaminoxy; and amide groups such as N-methylacetamide and N-ethylacetamide.

The preferred organopolysiloxane which can be used herein has the average compositional formula (iv):

$$R^6_e SiO_{(4-e)/2} \quad \text{(iv)}$$

wherein $R^6$ which may be the same or different is a substituted or unsubstituted monovalent hydrocarbon group having 1 to 10 carbon atoms, preferably 1 to 8 carbon atoms, or hydroxyl group, and e is a positive number in the range of 1.5 to 2.8, preferably 1.8 to 2.5, more preferably 1.95 to 2.05, and is capped with hydroxyl groups or hydrolyzable groups (as described above) at both ends of the molecular chain.

In addition to hydroxyl groups or hydrolyzable groups as described above, exemplary groups of $R^6$ are as exemplified for $R^3$ in formula (i). The organopolysiloxane may contain silicon atom-bonded groups other than the silanol groups or silicon atom-bonded hydrolyzable groups and phenyl groups, examples of such other groups including alkyl groups such as methyl, ethyl and propyl, cycloalkyl groups such as cyclopentyl and cyclohexyl, alkenyl groups such as vinyl and allyl, and aralkyl groups such as 2-phenylethyl.

Also preferably, the polyorganosiloxane has a viscosity at 23° C. of 10 to 500,000 mPa.s, more preferably 400 to 200,000 mPa.s. With a viscosity at 23017° C. of less than 10 mPa.s, the resulting silicone rubber tends to have noticeably degraded physical properties. With a viscosity of more than 500,000 mPa.s, the silicone rubber composition tends to become difficult to handle or inefficient to work.

No particular limits are imposed on the molecular structure of the polyorganosiloxane. The molecular structures include straight chain, partially branched straight chain, branched chain, cyclic and dendritic (three-dimensional network) structures. Preferred is a straight-chain diorganopolysiloxane whose backbone consists essentially of repeating diorganosiloxane units and which is capped with silanol groups and/or hydrolyzable group-containing siloxy groups at both ends of the molecular chain.

It is only required that the polyorganosiloxane contain at least 5 mol % of diphenylsiloxane units or at least 10 mol % of methylphenylsiloxane units in the diorganosiloxane units of which the backbone is constructed, mol % being based on the entire base polymer. Then, for example, a mixture of 50 parts by weight of a both end silanol group-capped polydimethylsiloxane containing 10 mol % diphenylsiloxane and 50 parts by weight of a both end silanol group-capped polydimethylsiloxane is equally effective.

Examples of suitable polyorganosiloxane serving as the base polymer include both end silanol group-capped polydimethylsiloxane, both end silanol group-capped dimethylsiloxane (80 mol %)/methylphenylsiloxane (20 mol %) copolymers, both end trimethoxysiloxy group-capped polydimethylsiloxane, both end trimethoxysilyl group-capped dimethylsiloxane (80 mol %)/diphenylsiloxane (20 mol %) copolymers, both end methyldimethoxysiloxy group-capped polydimethylsiloxane, both end triethoxysiloxy group-capped polydimethylsiloxane, and both end trimethoxysilylethyl group-capped polydimethylsiloxane.

In the third embodiment wherein the composition is of the condensation reaction curing type, component (B) is a silane having at least three silicon atom-bonded hydrolyzable groups per molecule or a partial hydrolytic condensate thereof (i.e., siloxane oligomer having at least three hydrolyzable groups left per molecule) and optionally, a condensation reaction catalyst.

Examples of silicon atom-bonded hydrolyzable groups on the silane include alkoxy groups such as methoxy, ethoxy and propoxy; alkoxyalkoxy groups such as methoxyethoxy, ethoxyethoxy and methoxypropoxy; acyloxy groups such as acetoxy and octanoyloxy; ketoxime groups such as dimethylketoxime and methylethylketoxime; alkenyloxy groups such as vinyloxy, isopropenyloxy, and 1-ethyl-2-methylvinyloxy; amino groups such as dimethylamino, diethylamino and butylamino; aminoxy groups such as dimethylaminoxy and diethylaminoxy; and amide groups such as N-methylacetamide and N-ethylacetamide.

The silane may have a monovalent hydrocarbon group bonded to a silicon atom, examples of which include alkyl groups such as methyl, ethyl, propyl, butyl, pentyl, hexyl, heptyl, octyl, nonyl, decyl and octadecyl, cycloalkyl groups such as cyclopentyl and cyclohexyl, alkenyl groups such as vinyl and allyl, aryl groups such as phenyl, tolyl, xylyl and naphthyl, aralkyl groups such as benzyl, phenethyl, and phenylpropyl, and halogenated alkyl groups such as 3-chloropropyl and 3,3,3-trifluoropropyl. Exemplary silanes and partial hydrolyzates thereof include methyltriethoxysilane, vinyltriethoxysilane, vinyltriacetoxysilane, and ethylorthosilicate.

In the present composition, the silane or partial hydrolytic condensate thereof is preferably used in an amount of 0.01 to 20 parts by weight, more preferably 0.1 to 10 parts by weight per 100 parts by weight of component (A). With less than 0.01 part of the silane or partial hydrolytic condensate thereof, the composition tends to lose storage stability or adhesion. More than 20 parts of the silane tends to substantially retard the composition from curing.

The condensation reaction catalyst is optional. It is not essential when silanes having aminoxy, amino or ketoxime groups are used as the curing agent.

Examples of suitable condensation reaction catalysts include organic titanic acid esters such as tetrabutyl titanate and tetraisopropyl titanate; organic titanium chelates such as titanium bis(acetylacetato)diisopropoxide and titanium bis (ethyl acetoacetato)diisopropoxide; organic aluminum compounds such as aluminum tris(acetylacetonate) and aluminum tris(ethyl acetoacetate); organic zirconium compounds such as zirconium tetra(acetylacetonate) and zirconium tetrabutyrate; organic tin compounds such as dibutyltin dioctoate, dibutyltin dilaurate, and butyl tin 2-ethylhexoate; metal salts of organic carboxylic acids such as tin naphthenate, tin oleate, tin butyrate, cobalt naphthenate, and zinc stearate; amines and salts thereof such as hexylamine and dodecylamine phosphate; quaternary ammonium salts such as benzyltriethylammonium acetate; alkali metal salts of lower fatty acids such as potassium acetate and lithium nitrate; dialkylhydroxylamines such as dimethylhydroxylamine and diethylhydroxylamine; and guanidyl group-containing organic silicon compounds.

In the present composition, the condensation reaction catalyst is used in a catalytic amount, preferably 0.01 to 20 parts by weight, more preferably 0.1 to 10 parts by weight per 100 parts by weight of component (A). When the catalyst is essential, the composition may not cure to a full extent with less than 0.01 part of the catalyst. With more than 20 parts of the catalyst, the composition tends to lose storage stability.

The hydrophilic polyorganosiloxane composition of the invention includes as component (C) a polyether having the compositional formula (1):

$$R^1O(C_2H_4O)_m(C_3H_6O)_nR^1 \qquad (1)$$

wherein $R^1$ is hydrogen, a group of the formula: $C_3H_6SiR^2_k$  $(OR^2)_{3-k}$ (wherein $R^2$ is a monovalent hydrocarbon group and k is 0, 1, 2 or 3, preferably 0 or 1) or a monovalent hydrocarbon group, two $R^1$ groups may be the same or different, m is an integer of 0 to 100, n is an integer of 0 to 350, and the sum of m+n is an integer of 3 to 350, or a mixture of such polyethers.

The monovalent hydrocarbon groups represented by $R^1$ and $R^2$ are preferably those of 1 to 12 carbon atoms, more preferably 1 to 10 carbon atoms. Examples include alkyl groups such as methyl, ethyl, propyl, butyl, pentyl, and hexyl; alkenyl groups such as vinyl, allyl, butenyl and isopropenyl; cycloalkyl groups such as cyclopentyl and cyclohexyl; aryl groups such as phenyl, tolyl and xylyl; aralkyl groups such as benzyl and phenethyl; and halogenated alkyl groups such as 3,3,3-trifluoropropyl and 3-chloropropyl. Of these, the alkyl and alkenyl groups are preferred. Most preferably, $R^1$ is methyl, ethyl, vinyl, allyl or lauryl; and $R^2$ is methyl, ethyl or isopropenyl. The subscript m is an integer of 0 to 100, n is an integer of 0 to 350, and the sum of m+n is an integer of 3 to 350; preferably, m is 0 or an integer of 3 to 50, n is 0 or an integer of 3 to 320, and the sum of m+n is an integer of 3 to 320; more preferably m is 0 or an integer of 3 to 20, n is 0 or an integer of 5 to 200, and the sum of m+n is an integer of 3 to 200; even more preferably m is 0 or an integer of 5 to 20, n is 0 or an integer of 5 to 100, and the sum of m+n is an integer of 5 to 100. It is noted that in the molecule, $(C_2H_4O)$ units and $(C_3H_6O)$ units may be arranged either in blocks or randomly. If the degree of polymerization of the polyether, represented by m, n or m+n, is too low, it may be difficult to impart sufficient hydrophilic property. If the degree of polymerization is too high, the polyether may separate from the composition in the uncured or cured state with the passage of time or the composition may be less resistant to weathering.

The polyether preferably has a number average molecular weight of about 150 to about 20,000, more preferably about 200 to about 15,000.

An appropriate amount of component (C) is 10 to 100 parts by weight, preferably 10 to 50 parts by weight, especially 20 to 50 parts by weight per 100 parts by weight of components (A) and (B) combined. Too small an amount of the polyether (C) may be difficult to render the composition fully hydrophilic. Too large an amount of the polyether (C) may separate from the composition in the uncured or cured state with the passage of time or deleteriously affect the weather resistance that the organopolysiloxane structure possesses in itself.

While the hydrophilic polyorganosiloxane composition of the invention comprises at least the aforementioned components (A) to (C), it may further include other optional components insofar as the objects of the invention are not compromised. Exemplary optional components include reinforcing fillers such as fumed silica, wet process powdered silica, crystalline silica, carbon black, red iron oxide, cerium oxide, titanium oxide, calcium carbonate, aluminum hydroxide, and titanic acid esters; the foregoing fillers which are surface treated with organosilicon compounds to be hydrophobic; addition reaction inhibitors such as acetylene compounds, hydrazine compounds, phosphine compounds and mercaptan compounds; flame retardants, plasticizers and tackifiers.

The present composition may be cured by any desired method. Any conventional method known to a particular cure system may be used. For example, the present composition is molded and then allowed to stand at room temperature. In another method, the present composition is molded and then heated at 50 to 200° C.

No particular limits are imposed on the state of the cured product obtained in this way. The cured product may range from high-hardness rubber products to low-hardness rubber or gel products. It is preferred that the cured product have a Type A Durometer hardness in the range of 5 to 90 as measured according to JIS K6253, because the product is fully adhesive to a member and easy to handle.

Also preferably, the cured product of the present composition has a contact angle of up to 70°, more preferably up to 65°, even more preferably up to 60°, as measured according to JIS R3257. The lower limit of contact angle is not critical although it is about 20° or greater, especially about 30° or greater.

The hydrophilic polyorganosiloxane composition of the invention cures into an elastomeric or gel-like silicone product having excellent hydrophilic properties and prevents separation of polyether over time. The hydrophilic polyorganosiloxane composition is thus suited for use as building members whose surface is to be coated with aqueous paint and as dental impression material.

EXAMPLE

Examples of the invention are given below by way of illustration and not by way of limitation. The viscosity is a measurement at 23° C.

Examples 1-18 & Comparative Examples 1-8

Polyorganosiloxane compositions of the formulation shown in Tables 1 to 5 were prepared. They were cured under the conditions shown in Tables 1 to 5, after which the cured products were measured for hardness by means of a Type A hardness meter according to JIS K6253 and contact angle according to JIS R3257. It is noted that aqueous paint can be applied to the surface of a sheet or a dental impression material exhibits favorable hydrophilic properties when the contact angle is equal to or less than 70° C. The compositions were aged at a temperature of 5° C. or 23° C. for 6 months, after which it was examined whether or not polyether oil component separated. The sample was rated "OK" when no separation was observed and "NG" when separation was observed.

The base polymers and polyethers used are identified below.

Base Polymer 1:
α,ω-vinyldimethylsiloxy group end-capped dimethylsiloxane/diphenylsiloxane copolymer (viscosity=4000 mPa.s; the content of diphenylsiloxane units in backbone diorganosiloxane units=30 mol %)

Base Polymer 2:
α,ω-vinyldimethylsiloxy group end-capped dimethylsiloxane/diphenylsiloxane copolymer (viscosity=3000 mPa.s; the content of diphenylsiloxane units in backbone diorganosiloxane units=10 mol %)

Base Polymer 3:
α,ω-vinyldimethylsiloxy group end-capped polydimethylsiloxane (viscosity=600 mPa.s)

Base Polymer 4:
α,ω-hydroxy group end-capped dimethylsiloxane/diphenylsiloxane copolymer (viscosity=20000 mPa.s; the content of diphenylsiloxane units in backbone diorganosiloxane units=20 mol %)

Base Polymer 5:
α,ω-hydroxy group end-capped polydimethylsiloxane (viscosity=700 mPa.s)

Base Polymer 6:
α,ω-vinyldimethylsiloxy group end-capped dimethylsiloxane/diphenylsiloxane copolymer (viscosity=5000 mPa.s; the content of diphenylsiloxane units in backbone diorganosiloxane units=3 mol %)

Polyether 1:

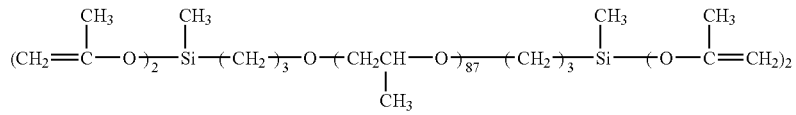

Polyether 2:

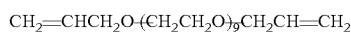

CH$_2$=CHCH$_2$O-(CH$_2$CH$_2$O)$_9$CH$_2$CH=CH$_2$

Polyether 3:

Naroacty N-40 (polyoxyethylene alkyl ether) by Sanyo Chemical Industries, Ltd.

Silica is R-972 by Nippon Aerosil Co., Ltd.

TABLE 1

| | Example | | | | | |
|---|---|---|---|---|---|---|
| | 1 | 2 | 3 | 4 | 5 | 6 |
| Ingredients (pbw) | | | | | | |
| Base Polymer 1 | 100 | 100 | 100 | 100 | 100 | 100 |
| Base Polymer 2 | | | | | | |
| Base Polymer 3 | | | | | | |
| Silica R-972 | | 10 | 10 | 10 | 10 | 10 |
| Polyether 1 | 100 | 80 | 40 | 30 | | |
| Polyether 2 | | | 10 | 10 | 15 | 10 |
| Polyether 3 | | | | 10 | | 10 |
| Pt catalyst[1] | 0.1 | 0.1 | 0.1 | 0.1 | 0.1 | 0.1 |
| Inhibitor[2] | 0.1 | 0.1 | 0.1 | 0.1 | 0.1 | 0.1 |
| Curing agent[3] | 5 | 5 | 8 | 15 | 18 | 15 |
| Curing conditions: 100° C./1 hour | | | | | | |
| Hardness (Type A) | 20 | 30 | 45 | 45 | 45 | 40 |
| Contact angle After 5° C./6 month aging | 60° | 65° | 50° | 40° | 55° | 50° |
| Separation observed | OK | OK | OK | OK | OK | OK |

TABLE 2

| | Example | | | | | |
|---|---|---|---|---|---|---|
| | 7 | 8 | 9 | 10 | 11 | 12 |
| Ingredients (pbw) | | | | | | |
| Base Polymer 1 | | | | 50 | 50 | 50 |
| Base Polymer 2 | 100 | 100 | 100 | | | |
| Base Polymer 3 | | | | 50 | 50 | 50 |
| Silica R-972 | 10 | 10 | 10 | 10 | 10 | 10 |
| Polyether 1 | 80 | 40 | 30 | 30 | 40 | 30 |
| Polyether 2 | | 10 | 10 | | 10 | 10 |
| Polyether 3 | | | 10 | | | 10 |
| Pt catalyst[1] | 0.1 | 0.1 | 0.1 | 0.1 | 0.1 | 0.1 |
| Inhibitor[2] | 0.1 | 0.1 | 0.1 | 0.1 | 0.1 | 0.1 |
| Curing agent[3] | 3 | 5 | 5 | 5 | 15 | 15 |
| Curing conditions: 100° C./1 hour | | | | | | |
| Hardness (Type A) | 40 | 45 | 45 | 40 | 45 | 45 |
| Contact angle After 5° C./6 month aging | 65° | 50° | 40° | 65° | 55° | 50° |
| Separation observed | OK | OK | OK | OK | OK | OK |

TABLE 3

| | Comparative Example | | | |
|---|---|---|---|---|
| | 1 | 2 | 3 | 4 |
| Ingredients (pbw) | | | | |
| Base Polymer 3 | 100 | 100 | 100 | |
| Base Polymer 6 | | | | 100 |
| Silica R-972 | | 10 | 10 | 10 |
| Polyether 1 | 50 | 40 | 30 | 30 |
| Polyether 2 | | 10 | 10 | 10 |
| Polyether 3 | | | 10 | 10 |
| Pt catalyst[1] | 0.1 | 0.1 | 0.1 | 0.1 |
| Inhibitor[2] | 0.1 | 0.1 | 0.1 | 0.1 |
| Curing agent[3] | 5 | 15 | 15 | 12 |
| Curing conditions: 100° C./1 hour | | | | |
| Hardness (Type A) | 35 | 45 | 40 | 20 |
| Contact angle After 5° C./6 month aging | 90° | 50°-80° | 40°-70° | 50° |
| Separation observed | NG | NG | NG | NG |

[1] a toluene solution of platinum/1,3-divinyl-1,1,3,3-tetramethyldisiloxane complex having a platinum content of 0.5 wt %
[2] a 50% toluene solution of 1-ethynyl cyclohexanol
[3] a both end trimethylsiloxy group-capped dimethylsiloxane/methylhydrogensiloxane copolymer having a viscosity of 120 mPa·s (the content of silicon atom-bonded hydrogen atoms = 28.5 wt %)

TABLE 4

| | Example | | | | | |
|---|---|---|---|---|---|---|
| | 13 | 14 | 15 | 16 | 17 | 18 |
| Ingredients (pbw) | | | | | | |
| Base Polymer 4 | 100 | 100 | 100 | 100 | 50 | 70 |
| Base Polymer 5 | | | | | 50 | 30 |
| Silica R-972 | | 10 | 10 | 10 | 10 | 10 |
| Polyether 1 | 100 | 80 | 40 | 30 | 80 | 30 |
| Polyether 2 | | | 10 | 10 | | 10 |
| Polyether 3 | | | | 10 | | 10 |
| Condensation catalyst[4] | 0.1 | 0.1 | 0.1 | 0.1 | 0.1 | 0.1 |
| Condensation curing agent[5] | 7 | 7 | 7 | 7 | 10 | 10 |
| Curing conditions: 23° C., 55% RH, 7 days | | | | | | |
| Hardness (Type A) | 15 | 30 | 25 | 25 | 30 | 25 |
| Contact angle After 23° C./6 month aging | 60° | 65° | 50° | 40° | 65° | 40° |
| Separation observed | OK | OK | OK | OK | OK | OK |

TABLE 5

| | Comparative Example | | | |
|---|---|---|---|---|
| | 5 | 6 | 7 | 8 |
| Ingredients (pbw) | | | | |
| Base Polymer 5 | 100 | 100 | 100 | 100 |
| Silica R-972 | | 10 | 10 | 10 |
| Polyether 1 | 100 | 80 | 40 | 30 |
| Polyether 2 | | | 10 | 10 |
| Polyether 3 | | | | 10 |
| Condensation catalyst[4] | 0.1 | 0.1 | 0.1 | 0.1 |

TABLE 5-continued

| | Comparative Example | | | |
|---|---|---|---|---|
| | 5 | 6 | 7 | 8 |
| Condensation curing agent[5] | 10 | 10 | 10 | 10 |
| Curing conditions: 23° C., 55% RH, 7 days | | | | |
| Hardness (Type A) | 15 | 30 | 25 | 25 |
| Contact angle | 60°-80° | 70°-90° | 50°-70° | 40°-60° |
| After 23° C./6 month aging | | | | |
| Separation observed | NG | OK | NG | NG |

[4] dibutyltin dilaurate
[5] methyltri(methylethylketoxime)silane

Japanese Patent Application No. 2002-350117 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. A hydrophilic polyorganosiloxane composition, curable by means of a hydrosilylation reaction, comprising
(A) a curable organopolysiloxane having a silicon atom-bonded alkenyl group and containing 10 to 50 mol % of diphenylsiloxane units or 20 to 50 mol % of methylphenylsiloxane units as a whole of component (A),
(B) an organohydrogenpolysiloxane as a curing agent for curing the organopolysiloxane (A),
(C) a polyether having the compositional formula (1):

$$R^1O(C_2H_4O)_m(C_3H_6O)_nR^1 \quad (1)$$

wherein $R^1$ is $C_3H_6SiR^2_k(OR^2)_{3-k}$ (wherein $R^2$ is a monovalent hydrocarbon group and k is 0, 1, 2 or 3, wherein at least one $R^2$ is an alkenyl group) or an alkenyl group, two $R^1$ groups may be the same or different, m is an integer of 0 to 100, n is an integer of 0 to 350, and the sum of m+n is an integer of 3 to 350, and
the polyether further comprises a polyether in which $R^1$ in formula (1) is hydrogen, $C_3H_6SiR^2_k(OR^2)_{3-k}$, or a monovalent hydrocarbon group and $R^2$ is a monovalent hydrocarbon group, provided that neither $R^1$ nor $R^2$ is an alkenyl group, and
(D) an addition reaction catalyst,
wherein said compositions cures to form a cured product having a contact angle of up to 55° as measured according to JIS R3257.

2. The hydrophilic polyorganosiloxane composition of claim 1, containing 10 to 100 parts by weight of component (C) per 100 parts by weight of components (A) and (B) combined.

3. The hydrophilic polyorganosiloxane composition of claim 1 for use as dental impression material.

4. The hydrophilic polyorganosiloxane composition of claim 1, wherein
component (A) is an alkenyl group-containing organopolysiloxane having on the average at least 0.1 silicon atom-bonded alkenyl groups per molecule and following average compositional formula (i):

$$R^3_aSiO_{(4-a)/2} \quad (i)$$

wherein $R^3$ is independently selected from substituted or unsubstituted monovalent hydrocarbon groups having 1 to 10 carbon atoms with the proviso that the content of alkenyl groups is about 0.0001 to 20 mol % based on the entire organic groups $R^3$, and "a" is a positive number in the range of 1.5 to 2.8, and
component (B) is an organohydrogenpolysiloxane having at least 2 silicon atom-bonded hydrogen atoms and the following average compositional formula (ii):

$$R^4_bH_cSiO_{(4-b-c)/2} \quad (ii)$$

wherein $R^4$ is a substituted or unsubstituted monovalent hydrocarbon group having 1 to 10 carbon atoms, b is a positive number of 0.7 to 2.1, c is a positive number of 0.001 to 1.0, and the sum of b+c is 0.8 to 3.0, and an addition reaction catalyst.

5. A dental impression material comprising the hydrophilic polyorganosiloxane composition of claim 1.

6. A building member comprising the hydrophilic polyorganosiloxane composition of claim 1.

7. A method of preparing a cured product of a hydrophilic polyorganosiloxane composition containing a polyether in a manner so as to prevent separation of the polyether over time from said cured product, said method comprising the steps of:
preparing a hydrophilic polyorganosiloxane composition by means of a hydrosilylation reaction comprising combining
(A) a curable organopolysiloxane having a silicon atom-bonded alkenyl group and containing 10 to 50 mol % of diphenylsiloxane units or 20 to 50 mol % of methylphenylsiloxane units as a whole of component (A),
(B) an organohydrogenpolysiloxane as a curing agent for curing the organopolysiloxane (A),
(C) a polyether having the compositional formula (1):

$$R^1O(C_2H_4O)_m(C_3H_6O)_nR^1 \quad (1)$$

wherein $R^1$ is $C_3H_6SiR^2_k(OR^2)_{3-k}$ (wherein $R^2$ is a monovalent hydrocarbon group and k is 0, 1, 2 or 3, wherein at least one $R^2$ is an alkenyl group) or an alkenyl group, two $R^1$ groups may be the same or different, m is an integer of 0 to 100, n is an integer of 0 to 350, and the sum of m+n is an integer of 3 to 350, and
the polyether further comprises a polyether in which $R^1$ in formula (1) is hydrogen, $C_3H_6SiR^2_k(OR^2)$ or a monovalent hydrocarbon group and $R^2$ is a monovalent hydrocarbon group, provided that neither $R^1$ nor $R^2$ is an alkenyl group, and
(D) an addition reaction catalyst, and
curing said hydrophilic polyorganosiloxane composition, wherein said compositions cures to form a cured product having a contact angle of up to 55° as measured according to JIS R3257.

8. A hydrophilic polyorganosiloxane cured product, obtained by curing the hydrophilic organopolysiloxane composition of claim 1, having a contact angle of up to 55° as measured according to JIS R3257.

9. A hydrophilic polyorganosiloxane composition, curable by means of a hydrosilylation reaction, comprising
(A) a curable organopolysiloxane having a silicon atom-bonded alkenyl group and containing 10 to 50 mol% of diphenylsiloxane units as a whole of component (A),
(B) an organohydrogenpolysiloxane as a curing agent for curing the organopolysiloxane (A),
C) at least two polyethers having the compositional formula (1):

$$R^1O(C_2H_4O)_m(C_3H_6O)_nR^1 \quad (1)$$

wherein $R^1$ is $C_3H_6SiR^2k(OR^2)_{3-k}$(wherein $R^2$ is a monovalent hydrocarbon group and k is 0, 1, 2 or 3, wherein at least one R² is an alkenyl group) or an alkenyl group, two R groups may be the same or different, m is an integer of 0 to 100, n is an integer of 0 to 350, and the sum of m+n is an integer of 3 to 350, a first polyether being a polyether in which m=0 in the compositional formula (1) and a second polyether being a polyether in which n=0 in the compositional formula (1), and (D) an addition reaction catalyst, wherein said compositions cures to form a cured product having a contact angle of up to 55° as measured according to JIS R3257.

10. The hydrophilic polyorganosiloxane composition of claim 9, containing 10 to 100 parts by weight of component (C) per 100 parts by weight of components (A) and (B) combined.

11. The hydrophilic polyorganosiloxane composition of claim 9 for use as dental impression material.

12. The hydrophilic polyorganosiloxane composition of claim 9, wherein component (A) is an alkenyl group-containing organopolysiloxane having on the average at least 0.1 silicon atom-bonded alkenyl groups per molecule and following average compositional formula (i):

wherein R³ is independently selected from substituted or unsubstituted monovalent hydrocarbon groups having 1 to 10 carbon atoms with the proviso that the content of alkenyl groups is about 0.0001 to 20 mol% based on the entire organic groups R³, and "a" is a positive number in the range of 1.5 to 2.8, and component (B) is an organohydrogenpolysiloxane having at least 2 silicon atom-bonded hydrogen atoms and the following average compositional formula (ii):

wherein R⁴ is a substituted or unsubstituted monovalent hydrocarbon group having 1 to 10 carbon atoms, b is a positive number of 0.7 to 2.1, c is a positive number of 0.001 to 1.0, and the sum of b

13. A dental impression material comprising the hydrophilic polyorganosiloxane composition of claim 9.

14. A building member comprising the hydrophilic polyorganosiloxane composition of claim 9.

15. A hydrophilic polyorganosiloxane cured product, obtained by curing the hydrophilic organopolysiloxane composition of claim 9, having a contact angle of up to 55° as measured according to JIS R3257.

16. A method of preparing a cured product of a hydrophilic polyorganosiloxane composition containing a polyether in a manner so as to prevent separation of the polyether over time from said cured product, said method comprising the steps of:

preparing a hydrophilic polyorganosiloxane composition by means of a hydrosilylation reaction comprising combining (A) a curable organopolysiloxane having a silicon atom-bonded alkenyl group and containing 10 to 50 mol% of diphenylsiloxane units as a whole of component (A), (B) an organohydrogenpolysiloxane as a curing agent for curing the organopolysiloxane (A), (C) at least two polyethers having the compositional formula (1):

wherein R¹ is C₃H₆SiR²k(OR²)₃₋ₖ(wherein R² is a monovalent hydrocarbon group and k is 0, 1, 2 or 3, wherein at least one R² is an alkenyl group) or an alkenyl group, two R¹ groups may be the same or different, m is an integer of 0 to 100, n is an integer of 0 to 350, and the sum of m+n is an integer of 3 to 350, a first polyether being a polyether in which m=0 in the compositional formula (1) and a second polyether being a polyether in which n=0 in the compositional formula (1), and (D) an addition reaction catalyst, and curing said hydrophilic polyorganosiloxane composition, wherein said composition cures to form a cured product having a contact angle of up to 55° as measured according to JIS R3257.

17. A hydrophilic polyorganosiloxane composition, curable by means of a condensation reaction, comprising (A) a curable organopolysiloxane having a silanol group or a silicon atom-bonded hydrolyzable group, and containing 10 to 50 mol % of diphenylsiloxane units or 20 to 50 mol % of methylphenylsiloxane units as a whole of component (A), (B) a curing agent having a hydrolyzable group for curing the organopolysiloxane (A), and (C) a polyether having the compositional formula (1):

wherein R¹ is C₃H₆SiR²ₖ(OR²)₃₋ₖ (wherein R² is a monovalent hydrocarbon group and k is 0, 1, 2 or 3, wherein at least one R² is an alkenyl group) or an alkenyl group, two R¹ groups may be the same or different, m is an integer of 0 to 100, n is an integer of 0 to 350, and the sum of m+n is an integer of 3 to 350, wherein said compositions cures to form a cured product having a contact angle of up to 55° as measured according to JIS R3257.

18. The hydrophilic polyorganosiloxane composition of claim 17, containing 10 to 100 parts by weight of component (C) per 100 parts by weight of components (A) and (B) combined.

19. The hydrophilic polyorganosiloxane composition of claim 17, wherein component (A) is a polyorganosiloxane having at least two silanol groups or silicon atom-bonded hydrolyzable groups per molecule and the following average compositional formula (iv):

wherein R⁶ which may be the same or different is a substituted or unsubstituted monovalent hydrocarbon group having 1 to 10 carbon atoms or a hydroxyl group, and e is a positive number in the range of 1.5 to 2.8, and is capped with hydroxyl groups or hydrolyzable groups at both ends of the molecular chain, and component (B) is a silane having at least three silicon atom-bonded hydrolysable groups per molecule or a partial hydrolytic condensate thereof.

20. The hydrophilic polyorganosiloxane composition of claim 17, wherein component (A) contains from 10 to 50 mol % of diphenylsiloxane units as a whole.

21. The hydrophilic polyorganosiloxane composition of claim 17, wherein the polyether further comprises a polyether in which R¹ in formula (1) is hydrogen, C₃H₆SiR²ₖ(OR²)₃₋ₖ, or a monovalent hydrocarbon group and R² is a monovalent hydrocarbon group, provided that neither R¹ nor R² is an alkenyl group.

22. The hydrophilic polyorganosiloxane composition of claim 17 for use as dental impression material.

23. A dental impression material comprising the hydrophilic polyorganosiloxane composition of claim 17.

24. A building member comprising the hydrophilic polyorganosiloxane composition of claim 17.

25. The hydrophilic polyorganosiloxane composition of claim 17, wherein component (C) is the combination of at least two polyethers comprising a first polyether in which m=0 in the compositional formula (1) and a second polyether in which n=0 in the compositional formula (1).

26. A method of preparing a cured product of a hydrophilic polyorganosiloxane composition containing a polyether in a manner so as to prevent separation of the polyether over time from said cured product, said method comprising the steps of:

preparing a hydrophilic polyorganosiloxane composition by means of a condensation reaction comprising combining (A) a curable organopolysiloxane having a silanol group or a silicon atom-bonded hydrolyzable group, and containing 10 to 50 mol % of diphenylsiloxane units or 20 to 50 mol % of methylphenylsiloxane units as a whole of component (A), (B) a curing agent having a hydrolyzable group for curing the organopolysiloxane (A), and (C) a polyether having the compositional formula (1):

$$R^1O(C_2H_4O)_m(C_3H_6O)_nR^1 \tag{1}$$

wherein $R^1$ is $C_3H_6SiR^2_k(OR^2)_{3-k}$ (wherein $R^2$ is a monovalent hydrocarbon group and k is 0, 1, 2 or 3, wherein at least one $R^2$ is an alkenyl group) or an alkenyl group, two $R^1$ groups may be the same or different, m is an integer of 0 to 100, n is an integer of 0 to 350, and the sum of m+n is an integer of 3 to 350, and curing said hydrophilic polyorganosiloxane composition, wherein said compositions cures to form a cured product having a contact angle of up to 55° as measured according to JIS R3257.

27. A hydrophilic polyorganosiloxane cured product, obtained by curing the hydrophilic organopolysiloxane composition of claim 17, having a contact angle of up to 55° as measured according to JIS R3257.

* * * * *